US007368001B2

(12) United States Patent
Carter

(10) Patent No.: US 7,368,001 B2
(45) Date of Patent: May 6, 2008

(54) VAPOUR RECOVERY SYSTEMS IN A STORAGE TANK FILLING PIPE

(75) Inventor: Rodney Carter, Sawston (GB)

(73) Assignee: Petroman Limited (GB)

( * ) Notice: Subject to any disclaimer, the term of this patent is extended or adjusted under 35 U.S.C. 154(b) by 554 days.

(21) Appl. No.: 10/533,186

(22) PCT Filed: Jul. 29, 2003

(86) PCT No.: PCT/GB03/03284

§ 371 (c)(1),
(2), (4) Date: Apr. 28, 2005

(87) PCT Pub. No.: WO2004/011363

PCT Pub. Date: May 2, 2004

(65) Prior Publication Data

US 2006/0048490 A1 Mar. 9, 2006

(30) Foreign Application Priority Data

Jul. 30, 2002 (GB) ................................ 0217673.3

(51) Int. Cl.
*B01D 53/18* (2006.01)

(52) U.S. Cl. ................... 95/149; 96/323; 261/DIG. 54; 261/DIG. 75

(58) Field of Classification Search .................. 95/149; 96/323, 275, 264; 261/DIG. 75, DIG. 54; 137/592, 563; 141/59
See application file for complete search history.

(56) References Cited

U.S. PATENT DOCUMENTS 6,099,616 A 8/2000 Jenne et al.
6,852,145 B2 * 2/2005 Muller ........................ 95/216
2003/0101868 A1 * 6/2003 Muller ........................ 95/216

FOREIGN PATENT DOCUMENTS

DE 1137392 9/1962
GB 1287872 9/1972
GB 1492499 11/1977
WO WO 01/48419 * 7/2001 .................. 95/216
WO WO 02/40393 5/2002

* cited by examiner

*Primary Examiner*—Duane Smith
*Assistant Examiner*—Douglas J Theisen
(74) *Attorney, Agent, or Firm*—Andrus, Sceales, Starke & Sawall, LLP

(57) ABSTRACT

A vapor recovery system for use during filling of a tank installation with a volatile liquid. The tank has a fill-pipe for the introduction of the liquid into the tank wherein the exit to which fill-pipe is normally below the liquid level in the tank. The vapor recovery system includes a reduced cross-sectional area region of the fill-pipe and a duct extending from that region through the side wall of the fill-pipe into the ullage space above the liquid level in the tank. The system further has a valve assembly associated with the duct which valve assembly normally closes off the duct, but which valve assembly is opened by flow of liquid along the fill-pipe into the tank, such that vapor in the tank may be drawn along the duct from the ullage space by the reduced static pressure in the region of reduced cross-sectional area of the fill-pipe. A method of recovering vapor using such a system is also described.

20 Claims, 7 Drawing Sheets

VAPOUR RECOVERY SYSTEMS IN A STORAGE TANK FILLING PIPE

CROSS-REFERENCE TO RELATED APPLICATIONS

This application is the U.S. national stage application of International Application PCT/GB2003/003284, filed Jul. 29, 2003, which international application was published on Feb. 5, 2004, as International Publication WO2004/011363 in the English language. The International Application claims priority of United Kingdom Patent Application 0217673.3, filed Jul. 30, 2002.

This invention relates to a vapour recovery system for use during filling of a tank for a volatile liquid. The invention further extends to a tank installation for volatile liquids and including such a vapour recovery system.

The invention is particularly concerned with tank installations for volatile liquid hydrocarbon fuels such as petroleum spirit, aviation spirit (or avgas) and diesel fuel, all of which liquid fuels are hereinafter referred to simply as "petrol". However, the invention could be used with tanks for other volatile liquids, where the tank content is periodically replenished.

In the ullage space above liquid petrol in a tank, there exists a mixture of air and petrol vapour. When the petrol is being replenished, the in-flowing petrol is in a state of considerable agitation and this tends to produce yet more petrol vapour. The in-flow of the petrol will displace a corresponding volume of vapour and it has been the practice for many years simply to discharge that vapour to atmosphere.

Environmental, health and safety grounds have recently insisted that attempts are made to collect the vapour displaced from a tank during replenishment of the petrol, and subsequently to condense that vapour back to liquid petrol. Consequently, many modern road delivery petrol tankers are equipped with vapour collection apparatus which is connected to a tank when a delivery is being made and the recovered vapour is returned to the tanker. Over many deliveries, significant quantities of recovered petrol can be involved, all of which represents a loss to the site operators.

In International Patent Specification No. WO 02/40393 (Molinar Limited) there is described a vapour recovery system intended for use with petrol tanks and in which vapour is drawn from the ullage space of a tank by a reduced pressure generated by the in-flow of liquid, on replenishing the petrol in the tank. This system relies on a connection externally of the tank to the fill-pipe and also either independently to the ullage space or to that space through a vent pipe to the tank. There is also described a system for fitting to the fill-pipe within the ullage space of the tank but this system cannot give safe operation when no filling is taking place and petrol is being drawn from the tank, for example to be dispensed to individual motor vehicles. This is because the ullage space is in direct communication with the fill-pipe when there is no in-flow of petrol and so both the fill-pipe and the ullage space will be at the same, usually sub-atmospheric, pressure.

A principal aim of the present invention is to provide apparatus for and a method of recovering vapour displaced from the ullage space of a tank during replenishment of a volatile liquid stored in the tank, which apparatus and method is integral with the tank and is caused to operate by the in-flow of the liquid, so recovering the condensed vapour into the tank.

According to a first aspect of this invention, a tank installation for a volatile liquid and having a fill-pipe for the introduction of the liquid into the tank wherein the exit to which fill-pipe is normally below the liquid level in the tank, there is provided a vapour recovery system for use during filling of the tank which system comprises:

- means defining a reduced cross-sectional area region of the fill pipe;
- a duct extending from the region of reduced cross-sectional area through the side wall of the fill-pipe to open into the ullage space above the liquid level in the tank; and
- a normally-closed valve assembly associated with the duct which valve assembly normally closes off the communication of the region of reduced cross-sectional area and the ullage space, but which valve is opened by flow of liquid along the fill-pipe into the tank, such that vapour in the tank may be drawn along the duct from the ullage space by the reduced static pressure in the region of reduced cross-sectional area of the fill-pipe.

According to a second aspect of this invention, there is provided a method of recovering vapour displaced from the ullage space of a tank installation during the introduction of a volatile liquid into the tank through a fill-pipe wherein the exit from the fill-pipe is normally below the liquid level in the tank, there being a reduced cross-sectional area region provided within the fill pipe, in which method vapour is drawn by a reduced pressure generated in the region of reduced cross-sectional area of the fill-pipe by the in-flow of liquid, the vapour being drawn through the side wall of the fill-pipe along a duct communicating between the ullage space and the region of reduced cross-sectional area, a normally-closed valve assembly being associated with the duct and which normally closes off the communication of the region of reduced cross-sectional area and the ullage space, which valve assembly is opened by the in-flow of liquid along the fill-pipe into the tank, such that the reduced static pressure in the region of reduced cross-sectional area draws vapour in the tank into the opened duct to be entrained in the in-flowing liquid.

The apparatus and method of this invention seeks to provide a region of low pressure within the fill-pipe, by virtue of the in-flow of the volatile liquid. That region of low pressure is connected back to the ullage space of the tank, but within the tank itself, such that vapour is drawn from the ullage space to the low pressure region. There, the vapour becomes entrained with the in-flowing liquid and at least some condensation of the vapour will take place, as the vapour is mixed with the liquid. Further, by appropriate configuration of the normally closed valve assembly, adiabatic expansion of the vapour may take place within the valve assembly, such that the vapour is cooled and this promotes the condensation thereof.

In a preferred embodiment of this invention, the vapour recovery system is formed as an integral unit adapted for fitting to a fill-pipe of a tank. The unit may be provided with a connector at each of its two ends, such that a fill-pipe may be parted below the mounting of the fill-pipe to a tank, the unit then being connected to the remaining upper part of the fill-pipe and the separated part of the fill-pipe being shortened as necessary and connected to the lower connector of the unit. Alternatively, the fill-pipe may be removed from a mount therefor, the unit is connected directly to that mount, and the shortened fill-pipe being connected to the unit.

The duct extending from the region of reduced cross-sectional area preferably has a first portion which extends from that region (where the reduced pressure is formed), upwardly away from the lower exit from the fill-pipe. The duct may then have a second portion which extends from the first portion generally outwardly of the fill-pipe to communicate with the ullage space of the tank. In such a case, the normally closed valve assembly may be furnished between the first and second portions of the duct and advantageously the first portion of the duct serves as a valve member for the valve assembly. For example, the first portion of the duct may be defined by a tube mounted for sliding movement coaxially within the fill-pipe and being spring-urged upwardly to a first position where the valve assembly is closed. Such a tube may be moved downwardly against the spring force under the action of the in-flow of liquid, down the fill-pipe into the tank.

In order to allow the tube to move and so open the valve assembly, the tube may be fitted with a spoiler and on which the liquid flow may act, to impart a force to the tube. Such a spoiler may comprise a vane, baffle or paddle lying in the liquid flow path along the fill-pipe. A preferred form of baffle comprises an annular cup surrounding the outer surface of the tube and facing the liquid flow direction.

In one embodiment, the normally closed valve includes a carrier which also defines the second portion of the duct and which is opened to the interior of the tube when the tube moves under the action of in-flowing liquid, but which is closed when there is no in-flow, because the tube will move back to a rest position under the action of the spring force, so closing the valve. To ensure the second portion of the duct, in communication with the ullage space of the tank, is closed-off from the tube when there is no in-flow, appropriate seals may be provided between the tube and the second portion. It is important that there is an adequate sealing, to isolate the ullage space of the tank (which will be at a sub-atmospheric pressure as liquid is drawn from the tank) from the interior of the fill-pipe, which normally will be more or less at atmospheric pressure.

The region of reduced cross-sectional area of the fill-pipe, at which a reduced pressure is produced during the in-flow of liquid, preferably is defined by an insert fitted to the internal wall of the fill-pipe. In a case where the fill-pipe is parted to permit the insertion of a separate vapour recovery unit, the insert may be fitted into the upper end of the separated part of the fill-pipe, before reassembly of that to the vapour recovery unit. In an alternative arrangement, the region of reduced cross-sectional area is defined by an element fitted to the end of the first portion of the duct, within the vapour recovery unit, nearer the exit end of the fill-pipe. In either case, the insert or element should suitably be profiled to define a venturi within which the speed of the liquid in-flow will be increased, so reducing the static pressure within that flow.

By way of example, two specific embodiments of vapour recovery units of this invention, and certain modifications thereof, will now be described in detail, reference being made to the accompanying drawings, in which.

Figure 6:
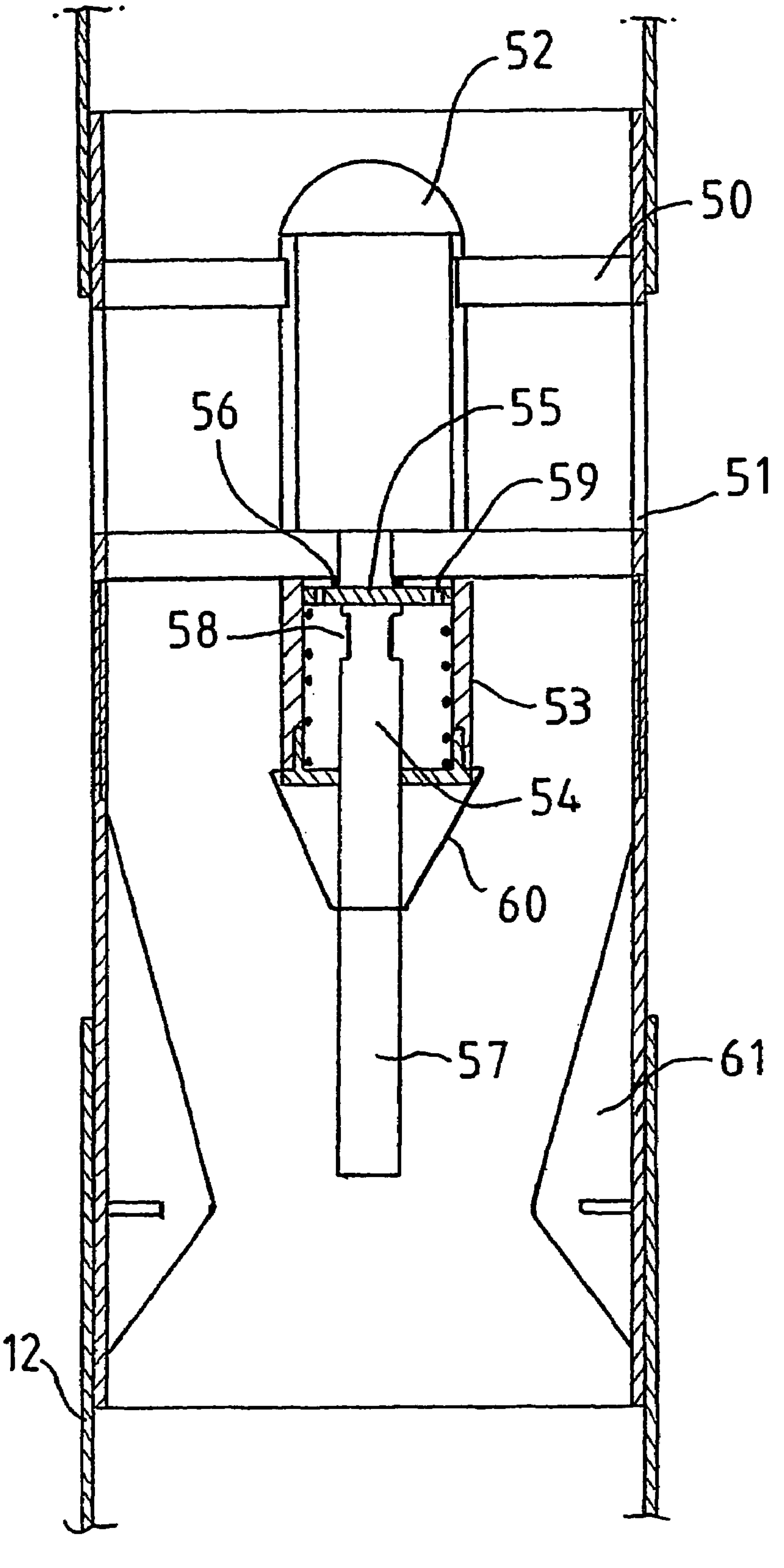
Figure 7:
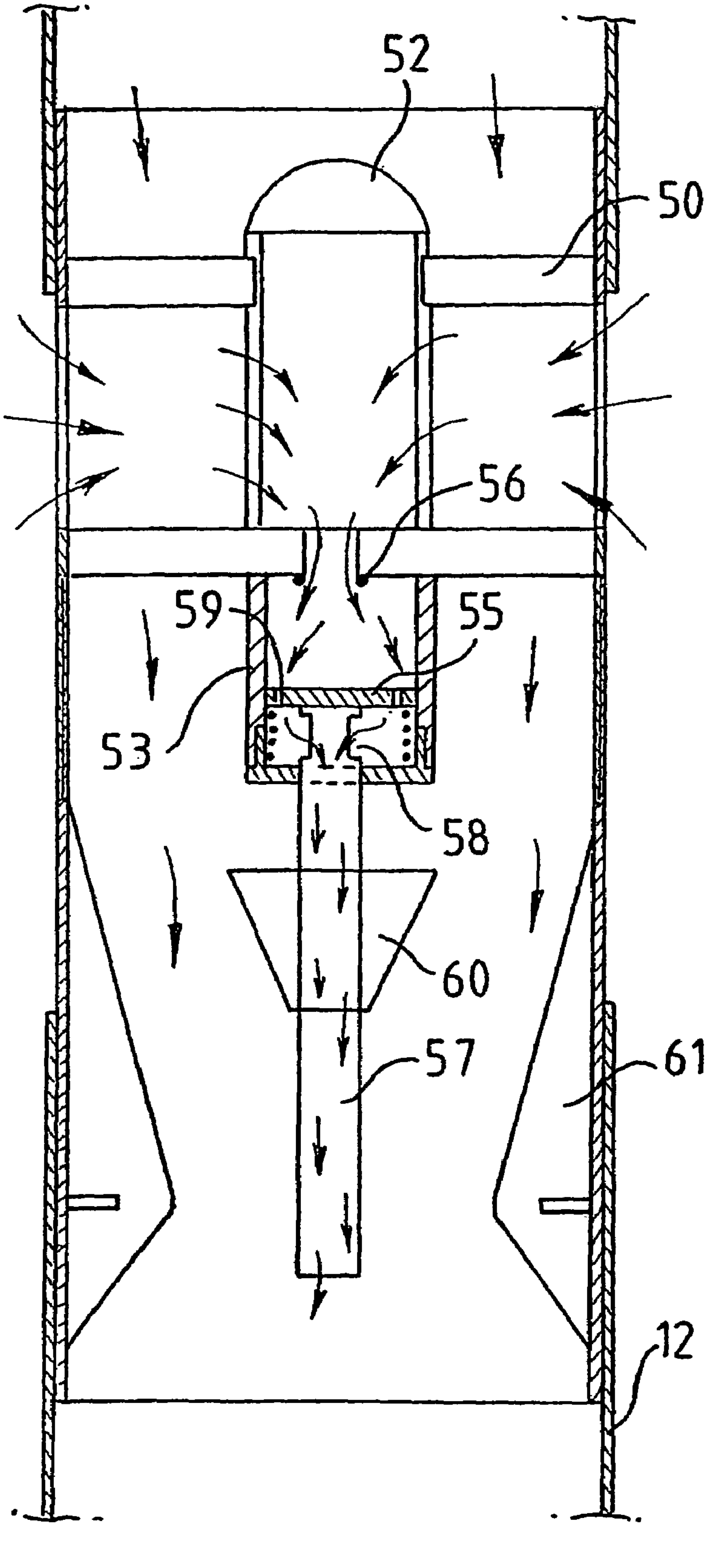
Figure 9:
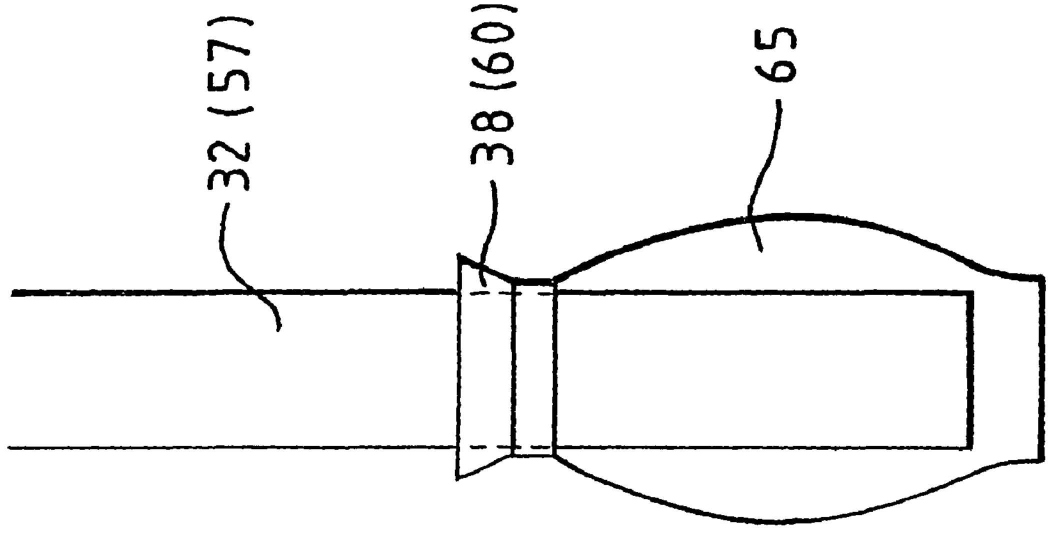
Figure 8:
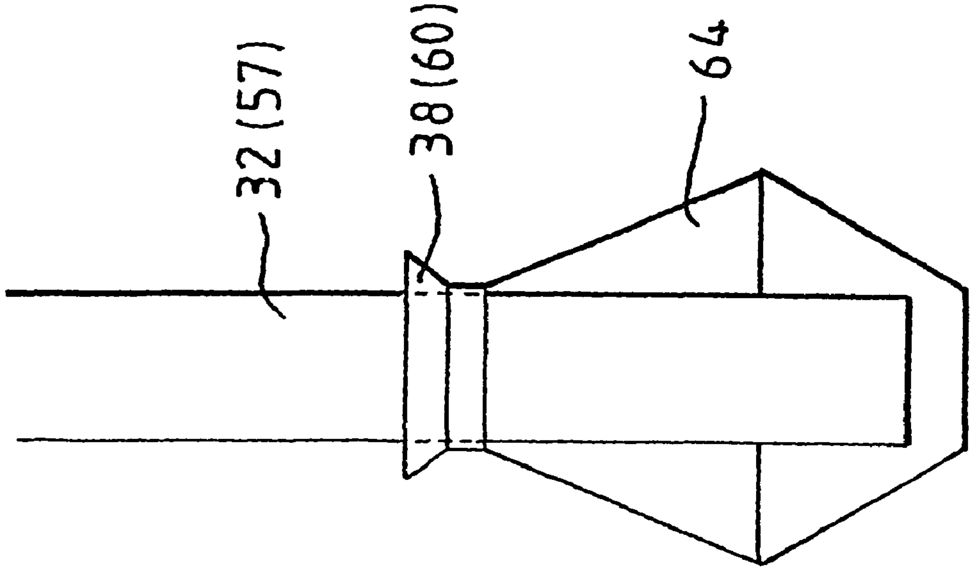

FIGS. 6 and 7 are sectional views through the second embodiment of vapour recovery unit and respectively in closed and opened positions; and FIGS. 8 and 9 show modifications of the tube used in the units of FIGS. 2 to 4 or FIGS. 6 and 7.

Figure 1:
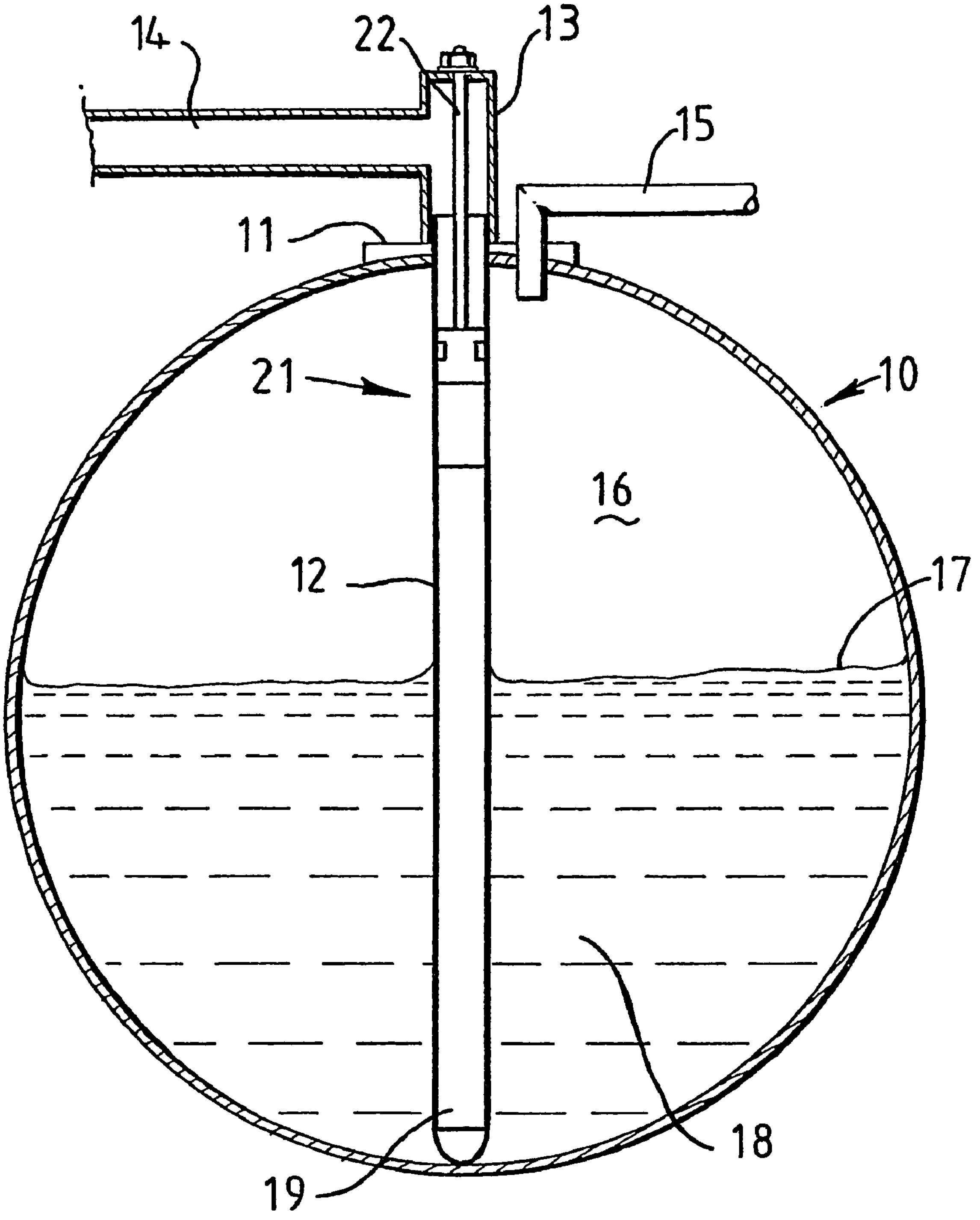
FIG. 1 is a diagrammatic vertical section through an underground forecourt petrol tank as installed at a petrol station for dispensing petrol to motor vehicles, which tank is fitted with the first embodiment of vapour recovery unit of this invention.

Referring initially to FIG. 1, there is shown diagrammatically an underground bulk petrol tank 10 provided with a manhole fitted with a cover 11 to which is mounted a fill-pipe 12, communicating through a T-connector 13 to a horizontal pipe 14 leading to a fill location whereat a road tanker may connect to the pipe 14 for a bulk delivery of petrol, to replenish the liquid in the tank 10. A vent pipe 15 communicates with the ullage space 16 within the tank 10, above the level 17 of liquid petrol 18 within the tank. The lower end 19 of the fill-pipe 12 is disposed below the level 17, for all normal operation of the tank. Such an arrangement is essentially conventional.

A vapour recovery unit 21 is fitted into the fill-pipe 12, immediately below the cover 11 and so within the ullage space 16 of the tank. To fit the unit 21, the fill-pipe is removed from a nipple screwed into the cover 11 and to the upper part of which is threaded the T-connector 13. The removed fill-pipe is shortened as necessary, and is connected to the lower end of the vapour recovery unit 21. The upper end of the unit 21 is then attached to the lower part of the nipple, below the cover 11, by means of interengaging threads. In addition to or instead of those threads, a securing bolt 22 may be provided, which bolt is threaded into an upper part of the unit 21 and extends out of the upper end of the T-connector 13, a suitable seal and fastening arrangement being provided for the bolt 22, externally of the connector. The bolt may be hollow to allow pressure measurements to be performed externally of the tank, to ensure that the vapour recovery unit 21 is operating satisfactorily during the in-flow of petrol.

Figure 2:
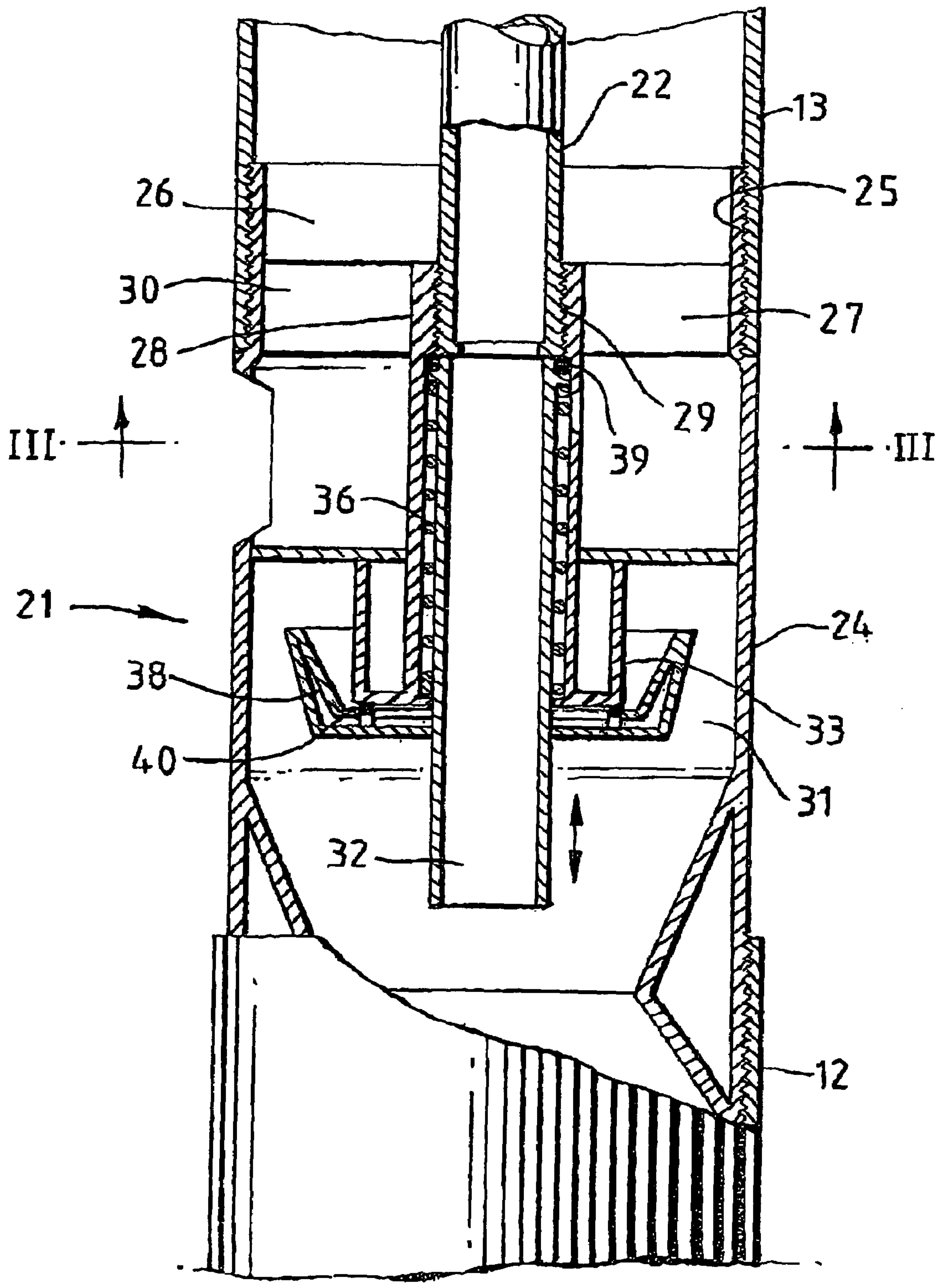
FIG. 2 is a detailed view on an enlarged scale of the vapour recovery unit fitted into the fill-pipe, but with the valve assembly in a first position.
Figure 3:
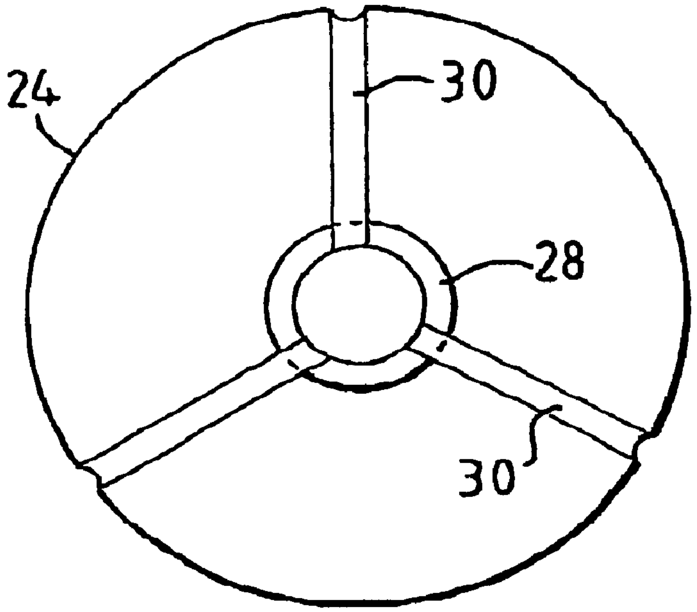
FIG. 3 is a horizontal sectional view through the unit of FIG. 2 taken on line II-III marked on that Figure.
Figure 5:
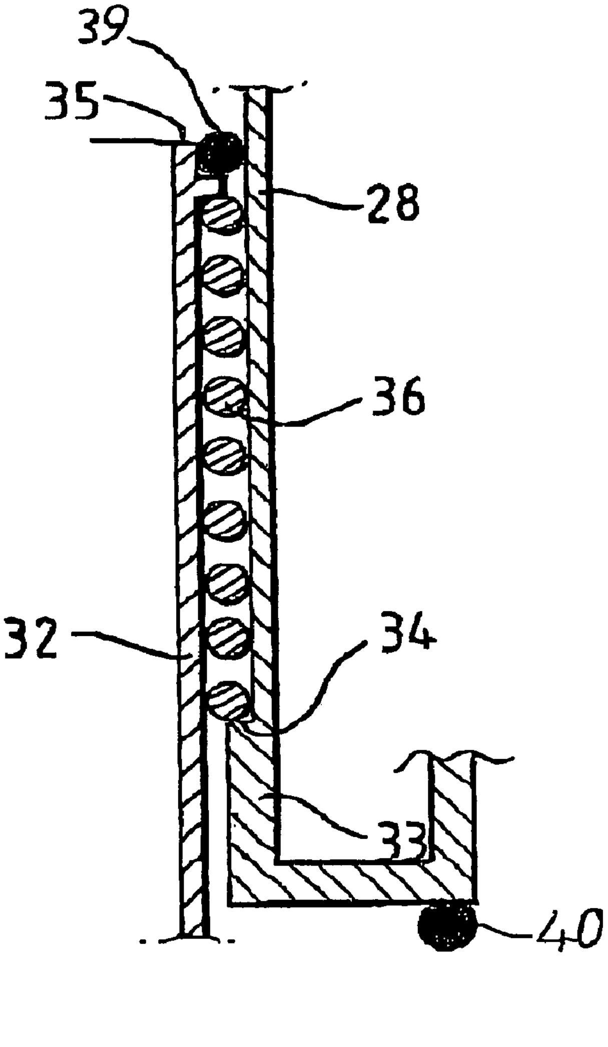
FIG. 5 is a detail of part of the valve assembly of FIGS. 2 and 4.
Figure 4:
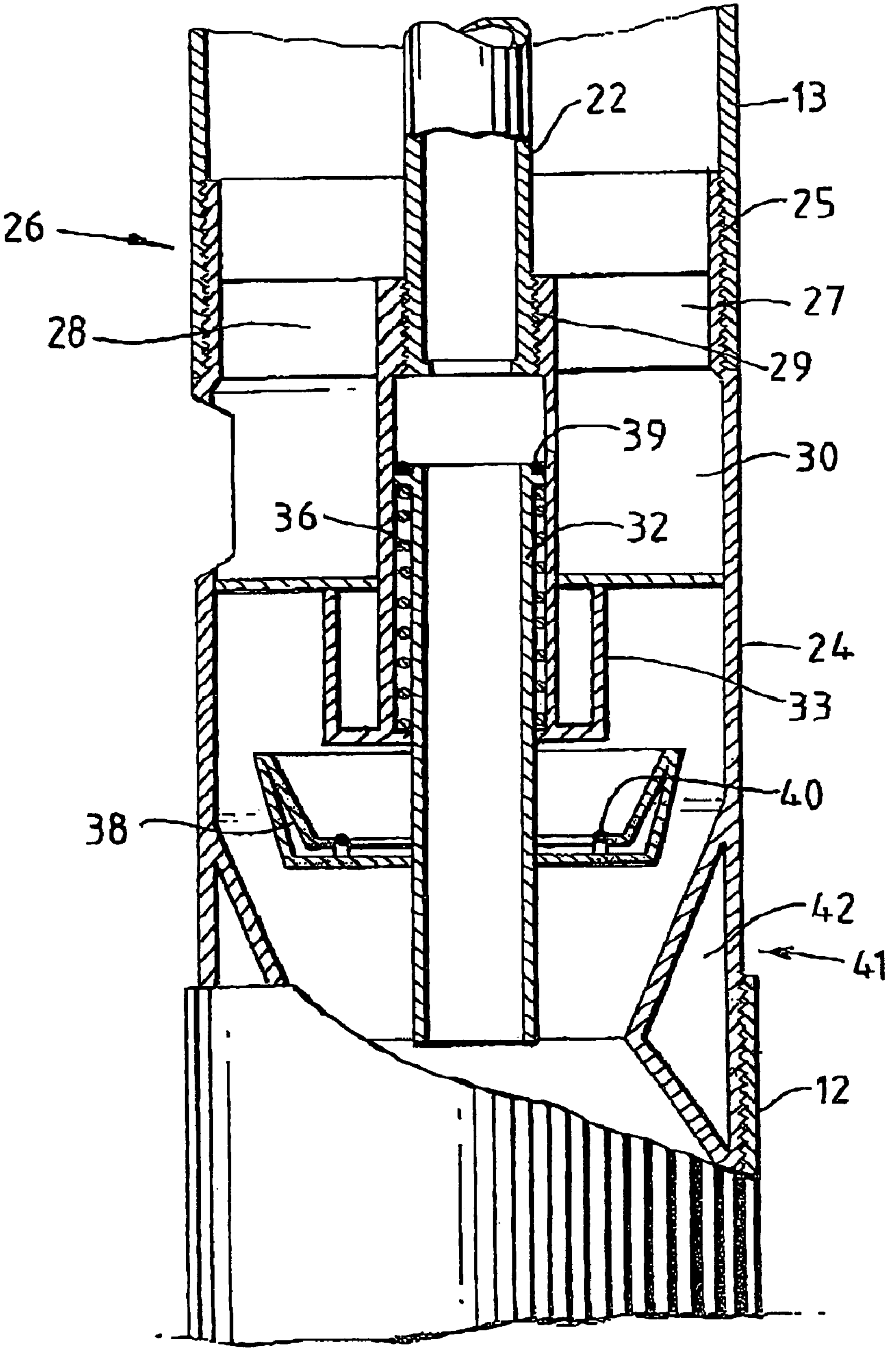
FIG. 4 is a view similar to that of FIG. 2 but with the valve assembly in a second (opened) position.

Referring now to FIGS. 2 to 5, the vapour recovery unit 21 is shown in more detail. This unit comprises a cylindrical shell-like main body 24 having external threads 25 at its upper end 26, for interengagement with the internal threads of the cover nipple. A three-armed spider 27 is provided within that upper end 26 and carries a central boss 28 provided with an internally threaded bore 29 with which bolt 22 is engaged. The arms 30 of the spider 27 are extended downwardly below the upper end 26, within a central region of the main body 24. In this central region, the arms are hollow, as best seen in FIG. 3, so as to give communication between the exterior of the unit 21 and the bore through the boss 28.

The boss 28 is extended downwardly below the arms 30 and so into the lower region 31 of the unit. A tube 32 is slidably mounted within this downward extension 33 of the boss 28, which tube may thus slide coaxially within the main body 24. Above the lower end of the boss 28, there is provided an internal shoulder 34 (FIG. 5) and the upper end of the tube 32 has an outwardly-projecting lip 35, a helical compression spring 36 encircling the tube and acting between the shoulder 34 and lip 35. In this way, the tube 32 is spring-biased upwardly to the position shown in FIG. 2, but may move downwardly against the action of the spring 36, to the position shown in FIG. 4.

Upward movement of the tube is limited by lip 35 engaging the three-armed spider 27 at the upper end 26 of the main body 24. Downward movement of the tube 32 is limited by binding of the turns of the spring 36. A cup-shaped baffle 38 is provided on the tube 32, immediately below the downward extension 33 of the boss 28, when the tube is in the position shown in FIG. 3, that baffle moving away from the extension 33 when the tube moves to the position shown in FIG. 4.

Both ends of the tube 32 are open and a seal ring 39 is provided below the three-armed spider 27 in the upper end 26 of the main body 24, such that when the tube is in the position shown in FIG. 2, the lip 35 will seal against the ring 39. A further seal ring 40 is provided between the baffle 38 and the lower end of the downward extension 33, so that an additional seal is formed here when the tube is in the position shown in FIG. 2. Movement of the tube downwardly to the position shown in FIG. 4 opens the communication between the hollow arms 30 and the interior of the tube 32, so giving communication between the ullage space of the tank, external to the fill-pipe, and the interior of the fill-pipe, below the tube 32. Return of the tube to the position shown in FIG. 2 closes off that communication and so isolates the ullage space from the interior of the fill-pipe below the vapour recovery unit 21.

The lower end 41 of the main body 24 is externally threaded so that the remaining part of the fill-pipe, following its removal from the cover nipple and appropriate shortening and threading, may be connected thereto. Within the lower part, there is provided an insert 42 which serves to reduce the cross-sectional area of the fill-pipe, the insert being profiled so as to define a venturi within the fill-pipe. Liquid-flow through that venturi will thus be of an increased speed, so reducing the static pressure within the venturi. The lower end of the tube 32 is exposed to that reduced pressure, during in-flow of liquid.

In operation, the in-flow of liquid along pipe 14 and then through the unit 21 into the fill-pipe 12 will generate a region of low pressure within the venturi-like insert 42. The in-flow of the liquid will impinge on the cup-like baffle 38, so moving the tube 32 downwardly against the action of spring 36. This opens the communication between the interior of the tube and the hollow arms 30, whereby the reduced pressure within the tube 32 will draw vapour into those hollow arms, from the ullage space of the tank. That vapour is carried downwardly through the tube 32 into the in-flowing liquid, to be entrained with that liquid and returned as at least partially condensed liquid, to the tank.

Referring now to FIGS. 6 and 7, there is shown a second embodiment which operates on much the same principles as that described above, and so the installation within a fill-pipe will not be described in detail here. In this embodiment, a four-armed spider 50 is provided within the main body 51 of the unit, each arm being hollow and communicating through the cylindrical wall of the main body to the ullage space of the tank. As shown in FIGS. 6 and 7, the upper end of the spider 50 is closed off with a screw-threaded cap 52 though a bolt and pressure tapping may be employed, as with the embodiment of FIGS. 1 to 5. A housing 53 is provided below the spider 50, a valve member 54 being slidably mounted within that housing for movement coaxially within the fill-pipe. The valve member has a head 55 which is a snug fit within the housing 53 and is spring-urged into engagement with the underside of the spider within the housing, a seal ring 56 being provided on the spider to effect a seal to the head when urged against the spider. The stem 57 of the valve member is hollow and apertures 58 are provided adjacent the head of the valve member, to communicate with the hollow stem. A plurality of relatively small through-bores 59 are formed in the head 55, on a greater pitch circle than the diameter of the seal ring 56, whereby liquid flow may take place through those bores 59 and into the stem 57, through the apertures 58, when the head has moved away from the spider.

As with the first embodiment, the stem 57 of the valve member is provided with a cup-shaped baffle 60 below the housing 53 and within the lower part of the main body 51 of the unit. Also, an insert 61 is provided within the lower part of the main body, to reduce the flow area.

When there is no in-flow of liquid along the fill-pipe 12, the valve is in the setting shown in FIG. 6. The head 55 engages the seal ring 56 and prevents communication between the hollow arms of the spider 50 and the housing 53. When there is liquid flow downwardly along the fill-pipe, the baffle 60 serves to move the valve member 54 against the action of the spring, so moving the head 55 away from the seal ring 56 and opening communication between the ullage space of the tank and the lower end of the hollow stem, through the arms of the spider and then through the bores 59 in the head 55 and into the apertures 58. As the through-bores 59 are of relatively small diameter, there will be adiabatic expansion of the vapour passing therethrough, which will cool the vapour so tending to condense it, to liquid petrol.

As an alternative to providing an insert within the lower part of the main body of the vapour recovery unit, or within the upper part of the fill-pipe which is attached to the lower part of the main body, the lower end of the tube 32 (or of the valve stem 57 in the case of the second embodiment of FIGS. 6 and 7) may carry a profiling element which serves to reduce the flow area within the fill-pipe. Two possibilities for such profiling elements are shown in FIGS. 8 and 9. The element 64 of FIG. 8 comprises two conical shapes arranged base-to-base whereby the flow is accelerated on passing the upper conical shape and is slowed again, on passing the lower conical shape. The element 65 of FIG. 9 has a more rounded profile but still serves to produce a venturi-like effect within the fill-pipe, in the lower region of the vapour recovery unit.

The invention claimed is:

1. A tank installation for a volatile liquid wherein there is an ullage space above the liquid in the tank in which said ullage space vapour collects, said tank installation having a fill-pipe for the introduction of volatile liquid into the tank, said fill-pipe having an exit which is normally within said liquid in the tank, and a vapour recovery system for use during filling of the tank to recover vapour displaced from said ullage space, said vapour recovery system comprising:

restriction means within the fill-pipe defining a region of the fill-pipe of reduced cross-sectional area whereby in-flow of liquid along the fill-pipe into the tank results in a reduced static pressure in said region;

a duct extending from said region of reduced cross-sectional area through the fill-pipe to open into said ullage space above the liquid in the tank; and a normally-closed valve assembly associated with the duct which valve assembly normally closes off communication through the duct between said region of reduced cross-sectional area and said ullage space, said valve being opened by in-flow of liquid along the fill-pipe into the tank, such that vapour in the ullage space is drawn from the ullage space along the duct by the reduced static pressure in the region of reduced cross-sectional area of the fill-pipe.

2. A vapour recovery system as claimed in claim 1, wherein the duct has a first portion and a second portion, said first portion extending from the region of reduced cross-sectional area of the fill-pipe upwardly away from the exit of the fill pipe, and said second portion extending from the first portion generally outwardly of the fill pipe to communicate with the ullage space of the tank.

3. A vapour recovery system as claimed in claim 2, wherein the normally-closed valve assembly is formed between the first and second portions of the duct.

4. A vapour recovery system as claimed in claim 2, wherein the first portion of the duct is defined by a tube mounted co-axially within the fill-pipe, the lower end of said tube being in the vicinity of the region of reduced cross-sectional area of the fill-pipe.

5. A vapour recovery system as claimed in claim 4, wherein the tube is mounted for sliding movement co-axially within the fill-pipe, the tube forming a part of the normally-closed valve assembly of the vapour recovery system.

6. A vapour recovery system as claimed in claim 5, wherein a spring applies a spring-force to the tube to urge the tube upwardly to a first position where the valve assembly is closed, and the tube is moved downwardly against the spring-force under the action of the in-flow of liquid, down the fill-pipe and into the tank.

7. A vapour recovery system as claimed in claim 6, wherein the tube is fitted with a spoiler, said spoiler lying in the liquid in-flow along the fill-pipe whereby the in-flow of liquid acts on the spoiler and so moves the tube downwardly against the spring-force.

8. A vapour recovery system as claimed in claim 7, wherein the spoiler projects into the liquid in-flow and is selected from the group consisting of a vane, a paddle and an annular cup surrounding the tube.

9. A vapour recovery system as claimed in claim 5, wherein the tube is mounted in a carrier which defines the second portion of the duct, the second portion of the duct being opened to the interior of the tube when the tube moves to open the valve assembly.

10. A vapour recovery system as claimed in claim 9, wherein the tube is provided with a head adjacent the carrier, said head being provided with a plurality of relatively small holes through which vapour passes on being drawn from the second portion of the duct to the first portion thereof, whereby the vapour is expanded and cools promoting the condensation thereof.

11. A vapour recovery system as claimed in claim 9, wherein a seal is provided between the tube and the carrier, said seal sealing the second portion of the duct from the interior of the tube when valve assembly is closed.

12. A vapour recovery system as claimed in claim 11, wherein said seal includes a first seal member arranged to seal off the upper end of the tube from the second portion of the duct when the valve assembly is closed.

13. A vapour recovery system as claimed in claim 12, wherein said seal includes a second seal member arranged to seal the exterior surface of the tube to the carrier, at least when the valve assembly is in its normally-closed setting.

14. A vapour recovery system as claimed in claim 9, wherein the carrier defines three second duct portions each extending generally outwardly from a central region of the carrier to the outer surface of the fill-pipe.

15. A vapour recovery system as claimed in claim 1, wherein the region of reduced cross-sectional area of the fill-pipe is defined by an insert, said insert being fitted internally of the fill-pipe.

16. A vapour recovery system as claimed in claim 2, wherein the region of reduced cross-sectional area of the fill-pipe is defined by an element fitted to an end of the first portion of the duct, said end being nearer the exit of the fill-pipe.

17. A vapour recovery system as claimed in claim 1, wherein the region of reduced cross-sectional area of the fill-pipe defines a venturi, wherein the speed of liquid in-flow is increased on passing through the venturi.

18. A vapour recovery system as claimed in claim 1, wherein the system is formed as a separate integral unit adapted for fitting to a tank fill-pipe.

19. A vapour recovery system as claimed in claim 18, wherein the separate integral unit has two ends each of which is provided with a respective connector, and the fill-pipe has an upper section connected to one connector of the integral unit, and a lower section connected to the other connector of the integral unit.

20. In a tank installation for a volatile liquid and having a tank with an ullage space above liquid in the tank wherein vapour from the liquid collects, said tank installation having a fill-pipe for the introduction of volatile liquid into the tank, said fill-pipe having an exit which is normally within the liquid in the tank, and a vapour recovery system for use during filling of the tank to recover vapour displaced from said ullage space as the volume of liquid in the tank increases, there being a region of reduced cross-sectional area provided within the fill pipe, a method of recovering vapour comprising:

generating a reduced static pressure within the region of reduced cross-sectional area by the in-flow of liquid along the fill-pipe;

drawing the vapour along a duct entering the fill-pipe so as to communicate between the ullage space and the region of reduced cross-sectional area, by virtue of the reduced static pressure at said region; and normally closing-off said communication of the ullage space with the region of reduced cross-sectional area by a normally-closed valve assembly associated with the duct, which valve assembly is opened by the in-flow of liquid along the fill-pipe into the tank during the filling thereof, such that the reduced static pressure in the region of reduced cross-sectional area during filling of the tank draws vapour from the ullage space in the tank into the opened duct to be entrained in the in-flowing liquid.

* * * * *